UNITED STATES PATENT OFFICE.

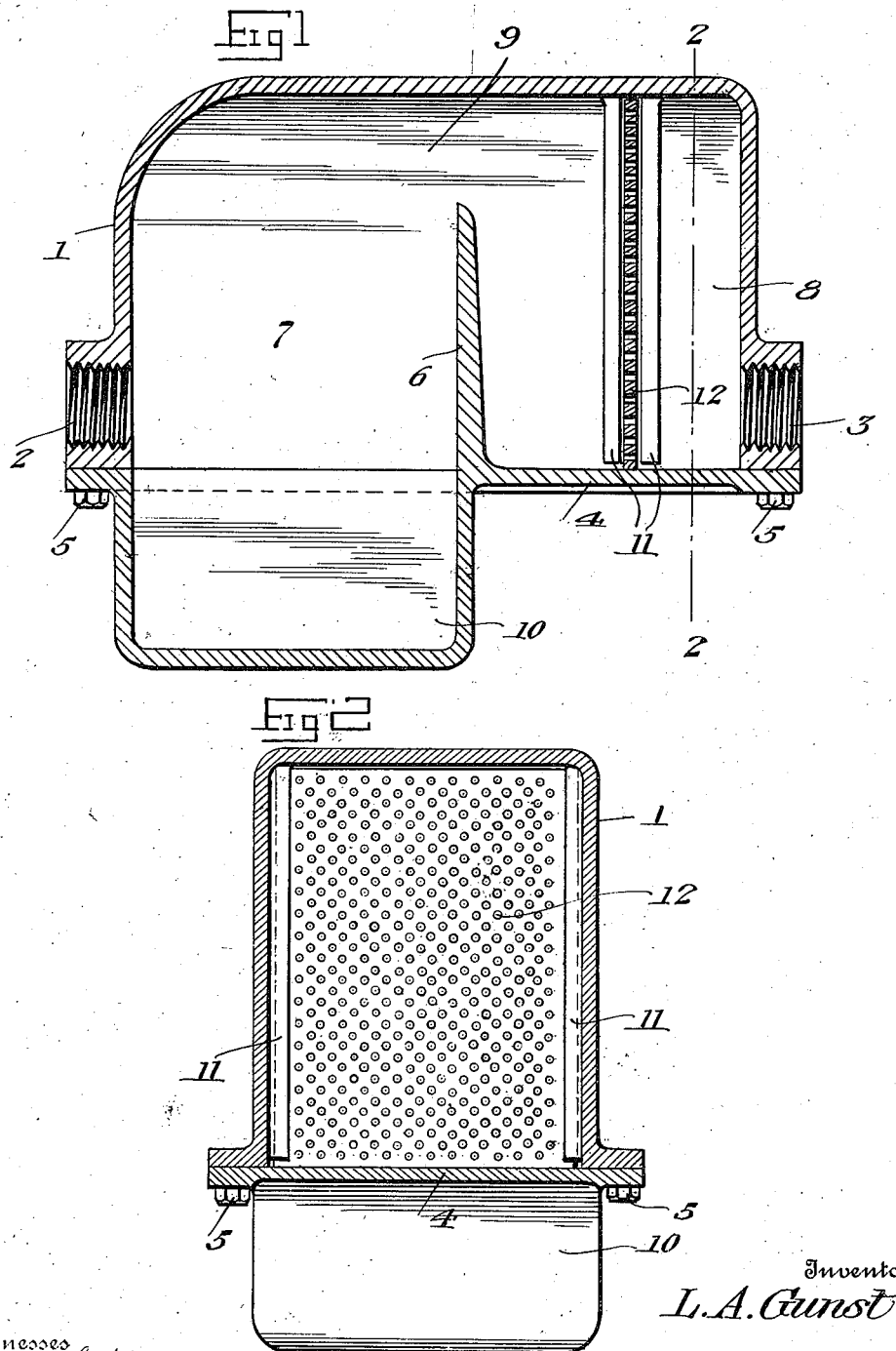

LAURITZ A. GUNST, OF OMAR, WEST VIRGINIA.

STRAINER OR SEPARATOR.

1,215,267.           Specification of Letters Patent.          Patented Feb. 6, 1917.

Application filed June 23, 1916. Serial No. 105,479.

*To all whom it may concern:*

Be it known that I, LAURITZ A. GUNST, a subject of the King of Denmark, residing at Omar, in the county of Logan and State of West Virginia, have invented new and useful Improvements in Strainers or Separators, of which the following is a specification.

This invention relates to a strainer or separator especially adapted for use in the water service systems and sanitary pipes or lines of steamships, but which is susceptible of use in other similar systems, the primary object of the invention being to provide a separator for arresting and preventing the passage into the system of foreign substances of any material size liable to give trouble.

A further object of the invention is to provide a strainer or separator which is simple and inexpensive of construction, reliable and efficient in operation, and capable of being readily and conveniently cleaned.

The invention consists of the features of construction, combination and arrangement of parts hereinafter fully described and claimed, reference being had to the accompanying drawing in which:—

Figure 1 is a vertical longitudinal section through the device.

Figure 2 is a vertical transverse section on the line 2—2 of Fig. 1.

In carrying my invention into practice, I provide a strainer or separator comprising a substantially oblong rectangular casing or shell 1, having at one end an inlet 2 and at its opposite end an outlet 3, said inlet and outlet being threaded for connection with pipe sections between which the device is in practice arranged and being located in proximity to the lower portion of said casing. The casing is open at the bottom and closed by a base plate 4 which is detachably secured in position by screws or other suitable fastenings 5, the construction being such as to provide for the ready removal of the base plate when occasion is required to clean the device or repair or renew any of its contained parts.

The casing is provided at a point about intermediate of its length with a vertical transverse baffle plate 6 separating said casing into primary and secondary chambers 7 and 8, which chambers are in direct communication respectively with the inlet 2 and outlet 3.

The baffle plate 6 extends entirely across the casing but terminates below the top of the casing to provide a passage-way 9 connecting the chambers 7 and 8 at their upper portions with each other. The baffle plate 7 is preferably carried by and integral with the base plate 4, and said base plate is provided with a depending chamber 10 forming a pocket or trap communicating with the bottom portion of the primary chamber 7 and arranged below the level of the inlet 2.

The side walls of the casing are provided with grooved guideways 11 to receive a perforated strainer plate 12, which strainer plate rests upon and may be carried by the bottom wall 4. The strainer plate is disposed between the outlet 3 and baffle 6 and extends the full depth of the chamber 8. The holes in this strainer plate are comparatively small in diameter, not exceeding one-fourth of an inch, and are sufficient in number to allow a surplus of area of the holes of at least 50% above the area of the fluid supply pipe, thus providing for the free passage of the fluid at all times, notwithstanding the fact that a comparatively large amount of matter may be caught and retained by the strainer.

In the use of the device, it is placed in the pipe line close to the water circulating pump, the water entering at the inlet 2, passing into the pocket 10 and chamber 7, thence flowing through the passage 9 into the chamber 8 through the screen 12, and finally discharging through an outlet 3 to the water supply system for circulation. On its admission into the separator the water strikes against the baffle 6, which forms a dam, whereby all rocks, gravel, mussels, etc., are stopped in the course of flow and caused to fall by gravity into the pocket 10, the water then flowing over the baffle and out through the separator as before described. Any seaweed or other lighter matter which may pass over the baffle with the water will strike against and be retained by the screen, whereby the water will be freed from all solid or large particles of matter liable to give trouble and the circulating system kept clear thereof.

From the foregoing description, taken in connection with the drawing, the construction, mode of operation and advantages of my improved separator will be readily understood. When the device is to be cleaned, which must be done at intervals, it will be understood that this may be effected by removing the fastenings 5, whereupon the bottom plate 4 will drop down with the screen 12 and may be entrapped within the separator, permitting the work to be readily and conveniently performed.

I claim:—

1. A separator of the character described comprising a casing having an inlet and an outlet, located at opposite sides thereof, said casing being provided with a detachable bottom portion having a depending pocket or chamber located at its side adjacent to said inlet, a screen extending the full depth of the casing and arranged between said pocket or chamber and the outlet of the casing, and an imperforate baffle plate fixed to the detachable bottom between the pocket or chamber and the screen, said plate extending from the detachable bottom upwardly to a point below the top of the casing.

2. A separator of the character described comprising a casing having an inlet and an outlet, located at opposite sides thereof, said casing being provided with a detachable bottom portion, said detachable bottom portion being provided with a depending pocket or chamber and a baffle plate extending upwardly into said casing to a point below the top of the casing between the said pocket or chamber and outlet and carried by and removable with said detachable bottom.

3. A separator of the character described comprising a casing having an inlet and an outlet, located at opposite sides thereof and provided with a detachable bottom, a baffle fixed to the detachable bottom and extending upwardly into said casing between the inlet and outlet, and a screen fixed to the detachable bottom and slidably engaging the casing between the baffle and outlet.

4. A separator of the character described comprising a casing having an inlet at one side thereof, an outlet at the opposite side thereof, a detachable bottom plate closing the bottom of the casing, said plate having a depending portion forming a trap or pocket adjacent to said inlet, a baffle plate rising from the detachable bottom between the trap and outlet and terminating below the top of the casing, and a screen disposed within the casing between the baffle and outlet, said screen slidably engaging the casing so as to be held in position by the bottom plate and being movable with the latter.

In testimony whereof I affix my signature.

LAURITZ A. GUNST.